Figure 8:
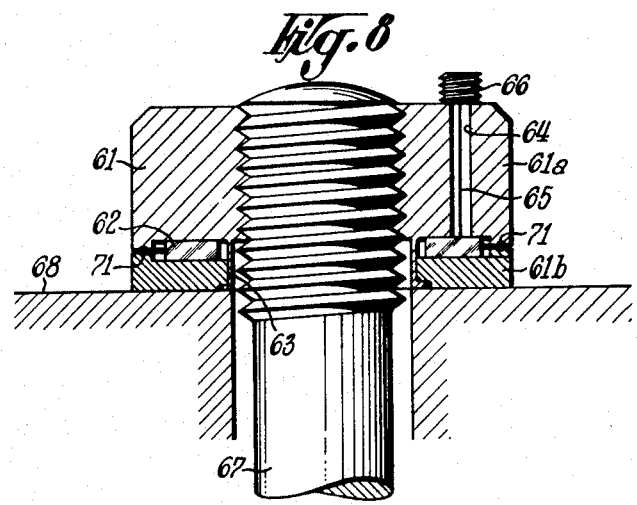

Sept. 29, 1964  H. C. SONDEREGGER ETAL  3,151,258
DEVICE FOR MEASURING THE FORCES BETWEEN
COMPONENTS OF AN ASSEMBLY
Filed Dec. 7, 1961  2 Sheets-Sheet 1
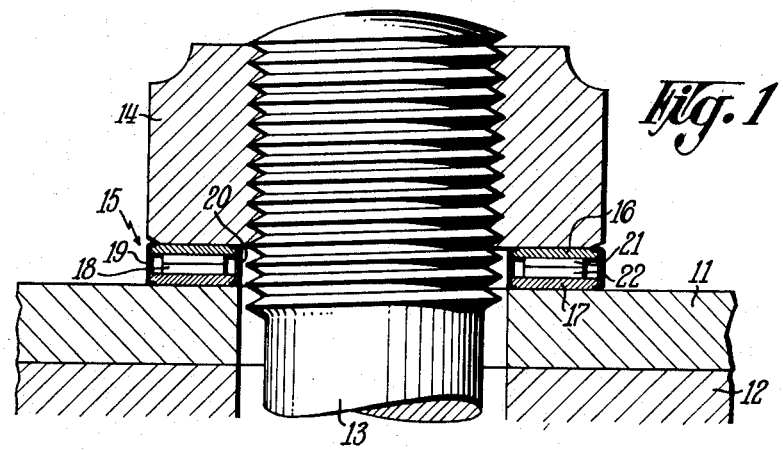
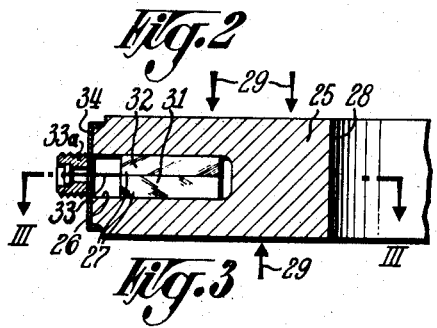
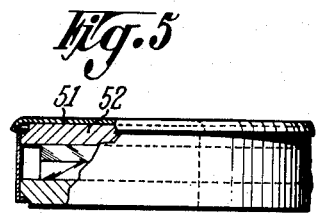
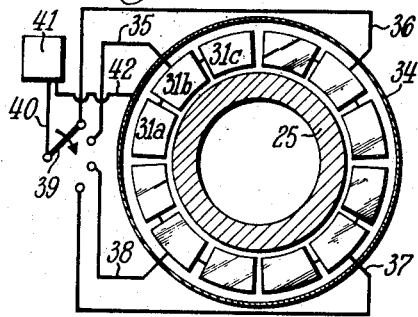
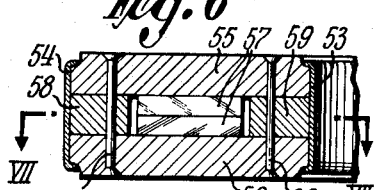
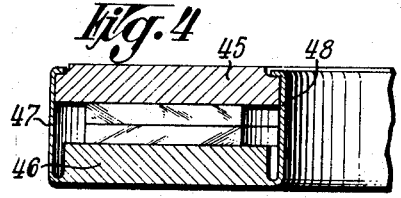
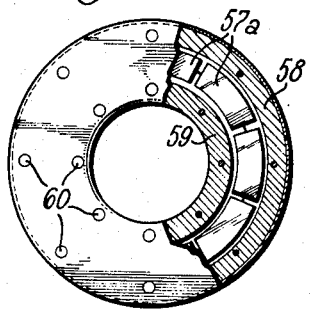
INVENTORS
Hans Conrad Sonderegger
Walter P. Kistler
BY Nolte & Nolte
ATTORNEYS INVENTORS
Hans Conrad Sonderegger
Walter O. Kistler
BY Nolte & Nolte
ATTORNEYS

United States Patent Office 3,151,258
Patented Sept. 29, 1964

3,151,258
DEVICE FOR MEASURING THE FORCES BETWEEN COMPONENTS OF AN ASSEMBLY
Hans Conrad Sonderegger, Breitestrasse 26, Winterthur, Switzerland, and Walter P. Kistler, 15 Webster St., North Tonawanda, N.Y.
Filed Dec. 7, 1961, Ser. No. 169,163
Claims priority, application Switzerland Dec. 10, 1960
13 Claims. (Cl. 310—8.7)

The inveniton relates to a device for measuring the forces between components of an assembly. In many machines it is desirable to know accurately the forces transmitted between the component parts thereof. This often applies in the case of screw joints where there must be added to the static initial stressing, dynamic stresses or stresses caused by heat expansion. The knowledge of these forces is necessary for the satisfactory proportioning of the screws, to ensure that the yield point is not exceeded in the case of dynamic stresses as well as for measuring the permanent pre-stressing and the tightness of the compressed parts.

The knowledge of such forces is of special value in the case of cylinder cover and bearing cover screws for internal combustion engines. Such screws are subjected to extremely high stresses and the proportioning of them involves difficulties owing to shortage of space.

As a rule, the static and dynamic stresses for a specific pre-stressing of a structure are determined purely arithmetically. In some cases only incomplete information is available as regards the elastic properties of the wall material absorbing the compression forces. In addition to this the temperature influences arising in operation can only be determined by calculation with difficulty.

It is true that in such cases individual measurements have been carried out by means of yield measuring strips. Such measurements are, however, very complicated and in many cases cannot be carried out owing to the limited room available, so that such measurements are generally carried out as individual investigations in laboratories; determination of the compression forces in machines in normal operation is virtually impossible, since the forces due to the measured expansion must be excluded. This calculation furthermore involves constants for the materials, the accuracy of which cannot often be accepted. Furthermore, measurement by means of field measurement strips pre-supposes completely symmetrical and exactly axial screw forces, which, however, seldom applies.

Measurement repeated at intervals in the case of machines in practical operation is furthermore made difficult or impossible since the strips must be replaced after a comparatively short time or again fitted into position, as a result of alteration of the strip material or of the adhesive. Similar difficulties arise where other components than screw joints are involved.

The invention permits the aforesaid difficulties and disadvantages to be overcome to a considerable extent. It is directed to devices for measuring both tension and compression forces within a constructional or machine assembly which embodies at least one component in the form of a commonly used machine element intended not exclusively for the assembly concerned, or which can accept such a component, and especially for measuring the forces transmitted by screw joints.

The invention is characterized by the fact that as the measuring element one of these machine elements is fitted with a built-in piezo-electric crystal arrangement, whereby the measuring element so constructed can be exchanged for the corresponding normal machine element.

In a device according to the invention the measuring element serves not only specifically for the measuring operation and inserted preliminarily in the constructional assembly and fulfilling merely the measuring function, but the measuring element forms an integral constructional part of the assembly itself and takes over not only the measuring function but the true action of the particular element associated with the constructional group concerned.

Since in this case a machine element is involved which is exchangeable with the corresponding normal element, the measuring device according to the invention can be inserted without any alteration in the construction of the group and without any additional provision, once and for all. It relates therefore not to a measuring device specifically designed for one application—for example on the measuring stand or in the laboratory—but rather the measuring element remains as a normal machine element in the constructional assembly concerned and hence permits the forces to be measured to be constantly supervised or for measurements to be taken periodically and, in fact, in practical operation.

The selection according to the invention of a piezoelectric crystal device as the true measuring cell permits in turn that the machine element including the crystal device shall have approximately the same stiffness or strength properties as the machine element substituted by the crystal device. This is done by using suitable crystals, for example those of quartz.

More particularly a constructional form of the invention is preferred in which the machine element constructed as the measuring element possesses the normal outer dimensions of the machine element pertaining to the group concerned. It thus relates to a virtually normal machine element which without any preparation can be inserted into a production machine and, with the exception of the small electric connections for the crystal device, differs hardly at all from the normal machine element in place of which the measuring element is inserted.

By appropriate choice of the piezo-electric crystals or the component materials of the parts receiving the crystal element, it is possible for the measuring element to have not only the same strength but also approximately the same elasticity and heat-expansion properties as the normal machine element which is replaced by the measuring elements. Also in this connection quartz crystals have proved to be particularly suitable. These are to a large extent temperature-resistant and permit measuring elements to be produced in the form of normal machine elements which for example permit accurate measurements up to 450° C.

Preferred constructional forms of the invention relate to the application to machine elements in the form of washers, collars, screw nuts and distance or spacer discs, as well as the appropriate construction thereof.

Figure 9:
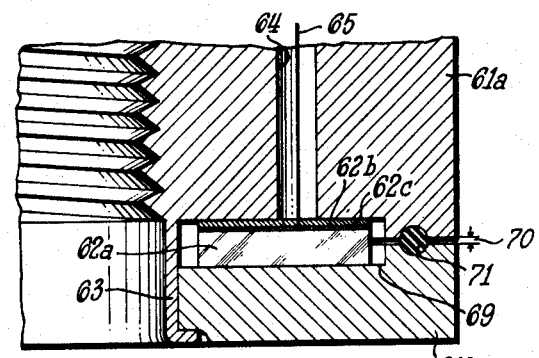
Figure 10:
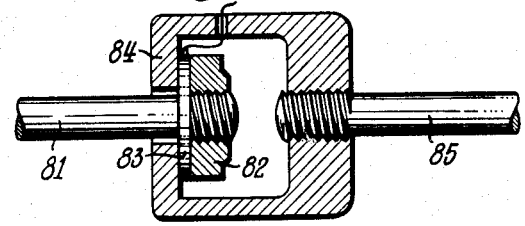

The invention and further features pertaining to it are explained hereinafter on the basis of the constructional examples shown in the accompanying drawings wherein:

FIG. 1 shows a joint formed by a screw bolt and nut between two machine elements, in section through the bolt axis, and a measuring element associated therewith in the form of a washer, FIG. 2 is an axial section through another constructional form of a washer serving as a measuring element, FIG. 3 is a section on the line III—III of the washer shown in FIG. 2 on a larger scale, FIG. 4, 5 and 6 are axial sections through three further constructional forms of a machine element in the form of a washer and serving as a measuring element, FIG. 7 shows a washer according to FIG. 6, partly in plan and partly in section on the line VII—VII in FIG. 6 on a reduced scale, FIG. 8 shows a joint formed by a screw bolt and nut between two machine parts in section as shown in FIG. 1 but with the screw nut serving as a measuring element, FIG. 9 is a partial section through the device of FIG. 8 on a larger scale, and FIG. 10 is a tension measuring device with a washer serving as a measuring element.

In the constructional example shown in FIG. 1 two machine parts 11 and 12 are held together under pressure by a joint formed by a screw bolt 13 and a nut 14. The screw bolt 13 bears on the part 12 in a manner not shown. For measuring the force transmitted through the bolt 13 or the nut 14 there is provided according to the invention, as the measuring element, a washer arranged between the nut 14 and the part 11 and indicated as a whole at 15. This washer consists of two component discs 16 and 17 with a piezo-electric crystal device 18 arranged between them. At the inner and outer periphery there are provided two sleeves 19 and 20 in the form of tubular springs, which press the two discs 16 and 17 together under pressure against the interposed crystal device in the manner to provide some pre-stressing between the parts. The sleeves 19 and 20 are very thin; their wall thickness amounts for example to only several hundredths of a millimeter.

The crystal device 18 consists conveniently of two ring-shaped crystal discs 21 and 22 which are so disposed one to the other that in the case of a pressure acting in the axial direction on the washer on the two bearing surfaces thereof, both crystal discs produce voltages of the same polarity, while the outer surfaces resting on the discs 16 and 17 produce voltages of opposite polarity in the crystal.

The voltages can be delivered in known manner for measuring purposes, for example on the one hand through the washer resting in contact with the frame of the machine and on the other hand by means of a take-off electrode disposed in the form of a thin metal foil between the two crystal discs, wherein the pick-up electrode and the frame of the machine are in suitable manner connected to an indicator device—for example with an oscillograph indicating the voltage.

The washer has the normal dimensions for the particular screw joint and differs in no way from a normal washer as regards its outer dimensions. There is obtained by the arrangement described a measuring element which can be inserted into new or existing constructions without any special provision and in the simplest way, which permits the axially exerted forces to be measured and supervised constantly or periodically.

To reduce the torque exerted by the nut on the washer during tightening of the nut it is advisable that the faces of the nut in contact with the washer should be treated with a suitable lubricant—for example one based on molybdenum disulphide.

In the embodiment shown in FIG. 2 a washer 25 is provided with a slot 26 parallel to its bearing surface, which serves for receiving a crystal device 27. In the region of the inner peripheral surface 28 the washer embodies a full and complete unweakened section which can be deformed slightly elastically under the influence of compression forces exerted in the direction of the arrow 29. Thereby the flap-like outer parts of the washer are compressed together and the force exerted on the crystal device is a measure of the whole compression force encountered.

By suitable design the relation between the size of the effective compression force and the voltage difference taken from the crystal device can be suitably related. For leading off the voltages on the adjacent upper faces of the crystals 31 and 32 a pick-up electrode 33 is used which is guided in an insulating manner through a take-off nipple 33a on the periphery of the washer.

In the arrangement described the torque necessarily exerted by the screw nut on the washer during tightening is absorbed virtually by the full cross-section of the washer. In the same way as in the device of FIG. 1 the outer surfaces of the washer are surrounded by a tubular spring 34 which is supported under pre-stressing on recesses in the two disc parts adjacent to the slot 26.

FIG. 3 shows a washer corresponding to FIG. 2 in section transversely to the plane of symmetry. In contradistinction to the arrangement according to FIG. 1 the crystal device does not consist of independent crystal rings but of a plurality of crystal elements 31a, 31b, 31c, etc., distributed around the periphery, and each of which consists of two individual crystals. The crystal units can all be connected in series in the measuring circuit of the indicating device.

Under some circumstances it is however advisable, as shown on the drawing, to provide means for selectively connecting the crystal units in individual sectors of the washer. Thus for this purpose the crystal units 31a, 31b and 31c are connected in series and connected to one pick-up conductor 35. In the same way each three other crystal units are connected with conductors 36, 37, 38.

By means of the rotary switch 39 and the conductor 40 the voltages produced by one of these crystal unit groups of one polarity can be supplied individually to the indicating device 41, while the voltages of opposite polarity relatively to the washer connected to the frame of the machine are fed through the conductor 42 to the indicating device. The latter corresponds to the potential difference between the conductors 40 and 42. By comparing the values measured by the individual sectors the distribution of the forces around the periphery of the washer, and thus for example the presence of an asymmetric force action, can be determined.

In the constructional example shown in FIG. 4 two partial disc parts of a washer are not held together by a separate tubular spring in the manner shown in the embodiment of FIGS. 1 and 2 but the lower partial washer disc 46 is formed at its inner and outer periphery as a sleeve-like projection 47, 48 extending vertically over the outer surfaces of the disc, which form the peripheral surfaces of the washer and fit over the sides of the other partial disc 45 and are applied thereto with a pre-stressing action. In this way a washer is obtained which is particularly well sealed hermetically from the outside which ensures disturbance-free operation of the crystal device.

For absorbing the rotary forces exerted by a nut on the washer during tightening, it is also possible as shown in FIG. 5 to provide a special slider ring 51 which can rotate relatively to the outer surface of the washer which otherwise is constructed as shown in FIG. 1. Preferably a suitable lubricating medium is inserted between the slider ring and the partial disc 52.

In the embodiments shown in FIGS. 6 and 7 a washer is constructed likewise of two partial discs 55 and 56 which enclose between them the crystal device 57. The two partial discs consist conveniently of steel. Radially within and externally of the crystal device 57 there is provided in each case a ring 58 or 59 between the partial discs 55 and 56. These rings can for example consist of brass or beryllium bronze, both being materials which offer the same flexure and elasticity properties as crystals consisting of quartz.

The complete article is held together by means of bolts 60 and is encapsulated hermetically by means of sleeves 53 and 54. The bolts 60 are produced from the same material as the rings 58 and 59 and can be riveted to the partial discs under pre-stressing as indicated. It would, however, also be possible to arrange the bolt 60 merely as pins preventing twisting between the parts and to draw them together with the necessary pre-stressing by means of sleeves 53 and 54 as shown in FIG. 1.

As shown in FIG. 7 the crystal device consists of crystal units 57a connected in series and distributed around the periphery. In the constructional form shown any torque forces transmitted by the nut are absorbed by the bolts 60 which hinder the two partial discs from twisting relatively one to the other and damaging the crystal device. Since the rings 58 and 59 have the same properties as regards heat expansion and modulus of elasticity, as crystals consisting of quartz they cannot influence the measurement result.

The constructional example shown in FIG. 8 relates to a machine element in the form of a nut 61 which embodies a built in piezo-electric crystal device 62 as a measuring element for determining the transmitted forces.

The nut is divided transversely to the axis. The upper part 61a carries the thread and comprises a downwardly extending sleeve-like projection 63 which clamps the lower part 61b of the nut so as to give pre-stressing of the crystal device. The upper part 61a of the nut also includes a bore 64 through which extends an insulated conductor 65 guided through the connecting nipple 66. The nut is mounted on a screw bolt 67 and bears against a constructional member 68.

On tightening an exactly fitting spanner is passed over both parts of the nuts whereby no damaging rotary forces are exerted on the crystal device.

FIG. 9 shows a partial section corresponding to FIG. 8 on a larger scale. The crystal device embodies for example a ring crystal 62a on the upper side of which a thin brass foil 62b is placed. The latter is insulated relatively to the upper part 61a of the nut by means of a layer of mica 62c. The support surface 69 for the under side of the crystal, which again consists of quartz, is ground optically flat and serves directly for supplying voltages of one polarity to the frame while the voltages of opposite polarity pass through the brass foil 62b and are fed to the conductor 65 connected to it. When the nut is tightened there is formed a slight gap 70 between the upper and lower parts of the nut which can be closed hermetically to the outside by means of a flexible seal 71.

It would obviously also be possible to form the crystal device 62 of two crystals laid one upon the other in the manner of the aforesaid constructional example, just as conversely in the said constructional examples it is possible and advantageous for thin washers to provide only a single crystal as seen in the axial direction which obviously must be mounted in an insulating manner on one side thereof.

Finally, FIG. 10 shows a constructional element which is applicable for measuring forces and comprises a machine element in the form of a washer utilized as a measuring element. This embodiment shows in particular how a pressure stressed piezo-electric cell can be utilized for determining tensional forces. For this purpose a pull rod 81 is supported by a nut 82 against a connecting member 84 by means of a washer 83 constructed in the manner of the constructional examples of FIGS. 1 to 8, while the other pull rod 85 is screwed to the coupling member 84. In this way the tensional force exerted by the pull rods is converted into a compression force which can be measured by means of the piezo-electric crystal device formed in the washer 83. To increase the sensitivity it is possible, as is also possible in the case of FIGS. 1 to 8, to lay several washers one upon the other and to connect them in series.

The invention is not limited to the constructional example shown. Also, other machine elements than washers and nuts may be used as the measuring element and may embody built-in photo-electric crystal devices, for example compression stressed screw bolts, piston rods and the like. A convenient application is formed by spacer members, for example in bearing constructions for drilling or boring machines or the like where the distance members can be stressed so as to show the compression force exerted on the shaft in the axial direction. In boring or drilling machines it is possible to determine, on the basis of the compression force disclosed by the device, the moment where the tool has reached the position shortly before penetration. Further, such spacer or intermediate discs can be inserted between the plunger and the tool of a press and permit an exact supervision of the pressure conditions during the working stroke.

What we claim is:

1. A device for measuring forces between at least two components of a structural assembly wherein at least one of said components is in the form of an exchangeable machine element, comprising component means having the physical dimensions of, and being capable of permanent substitution for, said machine element, and at least one piezo-electric crystal means lodged within said component means and serving as means for measuring the forces transmitted between said components.

2. A device according to claim 1, wherein said component means is in the form of a washer.

3. A device according to claim 2, wherein said washer comprises two discs, and said crystal means is interposed between said discs.

4. A device according to claim 3, wherein one of said discs is provided at its periphery with a sleeve-like projection extending perpendicularly to the outer surface of said discs, said projection forming the peripheral surface of said washer and being flanged on the edge of the other one of said discs.

5. A device according to claim 3, further comprising two concentric rings provided between said discs and made of a material having substantially the same elasticity and heat expansion as said crystal means, the latter being interposed between said rings, and holding means for immobilizing said discs against rotation.

6. A device according to claim 2, wherein said washer has therein an annular recess substantially parallel to the faces of said washer and serving to receive said crystal means.

7. A device according to claim 6, further comprising a thin-walled sleeve incorporated in the edge parts of said discs for closing off said recess and pre-stressing said crystal means.

8. A device according to claim 2, wherein said washer serves to support a nut forming part of said assembly, further comprising a slider ring on the side of said washer facing said nut.

9. A device according to claim 1, wherein said component means is in the form of a screw nut.

10. A device according to claim 9, wherein said nut has two portions divided transversely to the axis of the screw thread, and said crystal means is interposed between said nut portions, whereby means are provided for compressing said nut portions.

11. A device according to claim 10, wherein one of said nut portions is provided with a sleeve-like projection for clamping together said nut portions.

12. A device according to claim 1, wherein said crystal means are distributed in peripheral direction in said component means, and are electrically connected in series.

13. A device according to claim 12, wherein said crystal means are provided in individual sectors of said component means, further comprising means for selectively connecting any one of said crystal means within said measuring means.

References Cited in the file of this patent

UNITED STATES PATENTS

| | | |
|---|---|---|
| 2,188,356 | Jeans et al. | Jan. 30, 1940 |
| 2,648,833 | Wilson et al. | Aug. 11, 1953 |
| 3,036,283 | Singdale | May 22, 1962 |